United States Patent
Brandon

[15] 3,656,868
[45] Apr. 18, 1972

[54] METHOD OF PUMPING FLUIDS WITH AN ENERGY WAVE GENERATOR

[72] Inventor: Clarence W. Brandon, Tulsa, Okla.

[73] Assignee: Orpha B. Brandon, Nashville, Tenn. a part interest

[22] Filed: Aug. 7, 1969

[21] Appl. No.: 848,313

Related U.S. Application Data

[60] Division of Ser. No. 687,402, Dec. 1, 1967, Pat. No. 3,473,344, which is a continuation of Ser. No. 477,869, Aug. 6, 1965, abandoned, which is a continuation-in-part of Ser. No. 665,995, June 17, 1957, Pat. No. 3,302,720, and a continuation-in-part of Ser. No. 149,953, Nov. 3, 1961, Pat. No. 3,255,601.

[52] U.S. Cl. .................................. 417/53, 417/225, 417/391
[51] Int. Cl. ........................... F04b, F04b 17/00, F04b 35/00
[58] Field of Search ............................ 417/225, 53, 391, 392

[56] References Cited

UNITED STATES PATENTS

| 2,687,694 | 8/1954 | Conrad | 417/225 |
| 2,708,412 | 5/1955 | Mueller | 417/225 |
| 3,333,425 | 8/1967 | Hemard | 417/225 X |

*Primary Examiner*—Robert M. Walker

[57] ABSTRACT

A method of pumping fluids from lower pressures to higher pressures by means of an energy wave generator wherein the rarefactions of energy waves in the higher pressured fluid are an assisting means in the transfer of fluids from the lower pressure fluids, and wherein the wave generator has substantially equal pressure area relationships between the higher and lower pressures of fluids.

8 Claims, 4 Drawing Figures

Clarence W. Brandon
INVENTOR.

Clarence W. Brandon
INVENTOR.

Clarence W. Brandon
INVENTOR.

Clarence W. Brandon
INVENTOR.

METHOD OF PUMPING FLUIDS WITH AN ENERGY WAVE GENERATOR

This is a division of my prior copending application Ser. No. 687,402, filed Dec. 1, 1967, now U.S. Pat. No. 3,473,344 which is a continuation of application Ser. No. 477,869 filed Aug. 6, 1965, now abandoned, which in turn was a continuation-in-part of my application Ser. No. 665,995, filed June 17, 1957, now U.S. Pat. No. 3,302,720 and of Ser. No. 149,953, filed Nov. 3, 1961, now U.S. Pat. No. 3,255,601.

This invention relates to refrigeration, heating and related thermal energy transfer systems. More particularly, this invention relates to methods and apparatus wherein a liquid is maintained in equilibrium with its vapor phase, and where heat is absorbed by the vapor and given off by the liquid. Further, this invention relates to new and useful improvements in the use of energy carrying waves having the characteristics of sonic waves, which are utilized to increase thermal transfer efficiency and a resultant decrease in input energy requirements.

An important object of this invention is to provide means whereby an energy carrying wave generator or generators may be installed in the liquid of the condenser of a refrigeration or heat transfer system and by the operation of the generator or generators heat may be absorbed by the vapor in the evaporator and given off by the liquid in the condenser.

Still another important object in conjunction with the last above named object is to provide means whereby equilibrium of the liquid is maintained with its vapor phase, wherein the condenser is maintained substantially full of liquid and the evaporator is maintained substantially in a vapor phase, whereupon energy carrying waves are produced therein and unidirectional circulation of the refrigerant is achieved thereby.

Yet another object in conjunction with the last two objects is to provide a means whereby compression of the vapor from the evaporator is produced in a step-by-step manner by the energy carrying waves and wherein the heat of the vapor is given over into the compression phase of the energy carrying wave, whereby the energy content of the wave is increased and the requirement of energy input into the system, to maintain the circulation of the refrigerant, is reduced, while the thermal transfer efficiency of heat into the evaporator and from the condenser is increased therein.

A further main object is to provide means wherein the liquid within the condenser is divided into portions that have a unidirectional increase of pressure within the portions and wherein eductions of liquid from the condenser into the evaporator is done during the rarefaction phase of the energy carrying wave, thereby increasing the energy content thereof.

An object in conjunction with the use of energy carrying waves is to provide methods and apparatus wherein the sole means of transferring fluids from an area of low pressure to one of high pressure is by the use of an energy carrying wave generator or generators, and wherein the low pressure fluids being transferred balance the high pressure fluids, whereby the energy input into the energy carrying wave generator is maintained at a minimum.

A further important object is to provide methods and apparatus whereby the liquid in the condenser is maintained under a pressure which is sufficient to maintain the liquid in substantially an all liquid phase and whereby the use of an energy carrying wave generator or generators located within the liquid, which produces energy carrying waves within the liquid, vapor is inducted into and from the condenser, and wherein said induction and eduction of the vapor assists in the maintenance of said energy carrying wave. A continuing object in conjunction with this last object is to provide method and apparatus whereby the induction and eduction means at the opposite ends of the condenser are substantially in balance so that the input energy requirements needed to initiate and maintain the energy carrying wave which produces the induction and eduction of the vapor into and from the condenser is kept at a minimum.

Yet another important object is to provide process and means whereby energy may be taken from the expansion of the fluid and given to the compressing of the fluid while circulating the fluid by an energy wave generator.

These together with other objects and advantages which will become apparent reside in the details of construction and operation as more fully hereinafter described and claimed, reference being had to the accompanying drawings forming a part hereof, wherein like numerals refer to like parts throughout, and in which:

GENERAL DESCRIPTION

Figure 1:
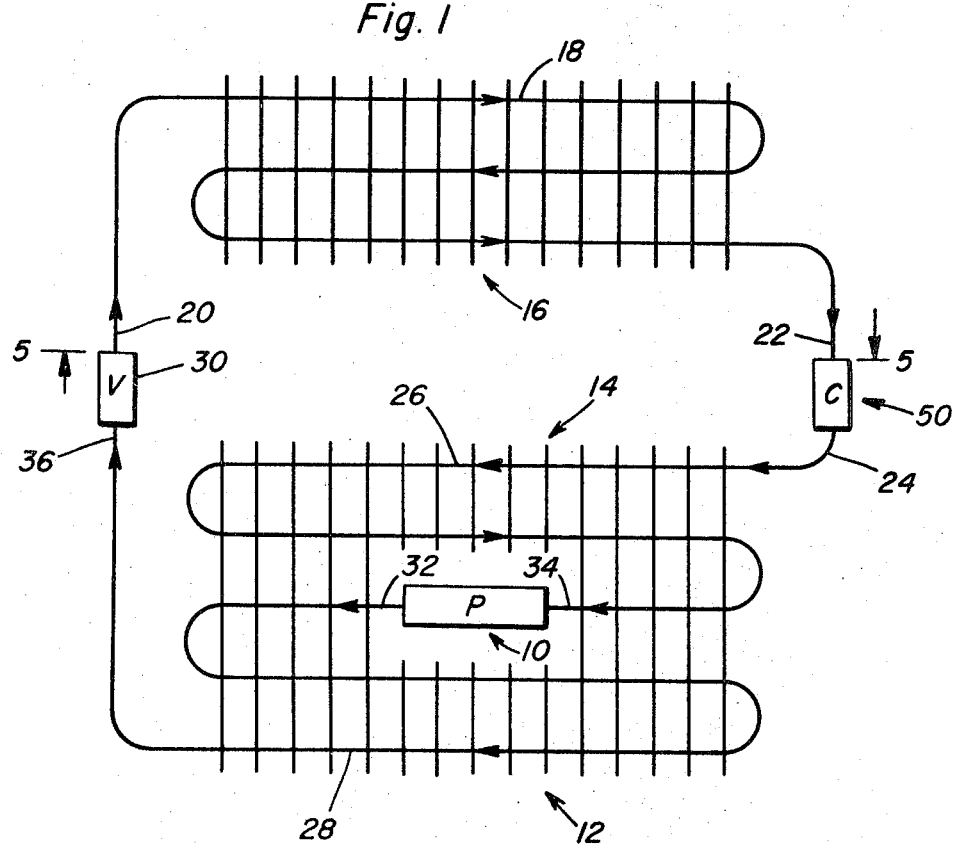
FIG. 1 is a diagrammatic view illustrating the application of the principles of this invention to a conventional refrigerating and heat pumping system of the circulatory type, with the exception that the pump for the circulatory system has been moved down into the condenser.

Generally speaking, this invention in its simplest form is concerned with the fact that a liquid when placed in equilibrium with its vapor phase within an enclosure will substantially maintain its liquid phase and its vapor phase despite considerable variations of pressure and temperature that may be imposed upon the enclosed system. In this invention, advantage is taken of this thermodynamic principle, in the absorption of heat by the vapor phase and of the giving off of heat by the liquid phase. This is done by the transfer of liquid, by an energy wave generator located in the liquid or condenser portion of the system, against a pressure reduction means located at the equilibrium point between the liquid and the vapor, whereupon heat is absorbed by the vaporized fluid in the vapor or evaporatory portion of the system and heat is rejected from the circulating fluid upon its re-entry into the liquid at the equilibrium point between the liquid and its vapor.

In the above form of this invention, there are step by step increases in pressure upon the liquid which is in two or more portions within the condenser as the circulating energy wave generators force the liquid against the fluid expansion means.

In a slightly more complex form of this invention, energy carrying waves are circulated throughout the system along with the fluid. This may be done by placing an energy wave generator, or generators, within the liquid of the condenser, thereby dividing the liquid in the condenser into portions, and by the use of these energy wave generators energy carrying waves may be initiated and maintained unidirectionally in both the liquid and the vapor portions which are substantially maintained in equilibrium throughout the system. Also, fluid expansion and compressing motors may be installed at the equilibrium points and be connected to lower the input energy that is required to operate the system.

In the use of energy bearing waves such as are taught in the use of the forms of this invention, the energy waves not only facilitate the phase changes from a liquid to a vapor and from a vapor to a liquid, but also increases the heat transfer co-efficiency of the liquid and vapor phase contacts with the containing walls of the system by the reduction in the thickness of the boundary layers on these walls through which the heat must be transferred.

A greatly increasing factor, in the use of energy bearing waves as shown in this invention, in the amount of heat absorbed by the vapor of the system and rejected by the liquid of the system, is that heat as energy is given into a phase angle of the compressive portions of the energy bearing waves. Heat alone may be utilized to initiate and maintain an energy carrying wave, so it may be seen that the more heat that is available to the vapor phase of the system of this invention and the more it is converted into energy within the circulating energy carrying wave, then the efficiency of the system will be increased rather than decreased as is the situation in conventional refrigerating and heat pumping systems, and like thermodynamic processes and systems.

DETAILED DESCRIPTION

In FIG. 1 there is diagrammatically illustrated a refrigerating and heat pumping system of the circulatory type to which the principles of this invention may be easily applied and which system includes a fluid compression means 50, a fluid expansion means 30, a refrigerant circulating means 10, an evaporator unit indicated generally by the numeral 16, and two condenser units indicated generally by the numerals 12 and 14. The evaporator unit is considered to extend from the fluid expansion means 30 to the fluid compression means 50, while the condensing units extend from the fluid compression means 50 to the fluid circulating means 10 and then to the fluid expansion means 30. In the refrigerating and heat pumping system illustrated, the refrigerant is understood to have a unidirectional circulation as indicated by the arrows in FIG. 1.

The evaporator unit 16 consists of a set of evaporating coils 18 which are understood to be in good heat exchange relation with a heating medium from which heat is removed, thus cooling the surrounding medium. The evaporating coils 18 of the evaporator are connected as by a conduit 20 with the fluid expansion means 30 and by a further conduit 22 with the intake side of the fluid compression means 50, it being understood that the coils 18 together with the conduits 20 and 22 comprise the evaporator unit 16.

The condenser unit 14 likewise includes a conduit 24 which receives the fluid from the fluid compression means 50 and by means of which the refrigerant is delivered to the condensing coils 26 which likewise are in good heat exchange with a surrounding medium, the latter being a cooling medium to which heat may be discharged from the condensing coils 26, and a conduit 34 by means of which the fluid is delivered to the fluid circulating means 10. The condenser unit 12 also includes a conduit 32 which receives the fluid from the fluid circulating means 10 and by which the refrigerant is delivered to the condensing coils 28 which likewise are in good heat exchange with a cooling medium to which heat may be discharged, and a conduit 36 which delivers the fluid to the fluid expansion means 30.

It is understood that the fluid circulating means 10 is operated from any suitable power source, as desired.

Figure 2:
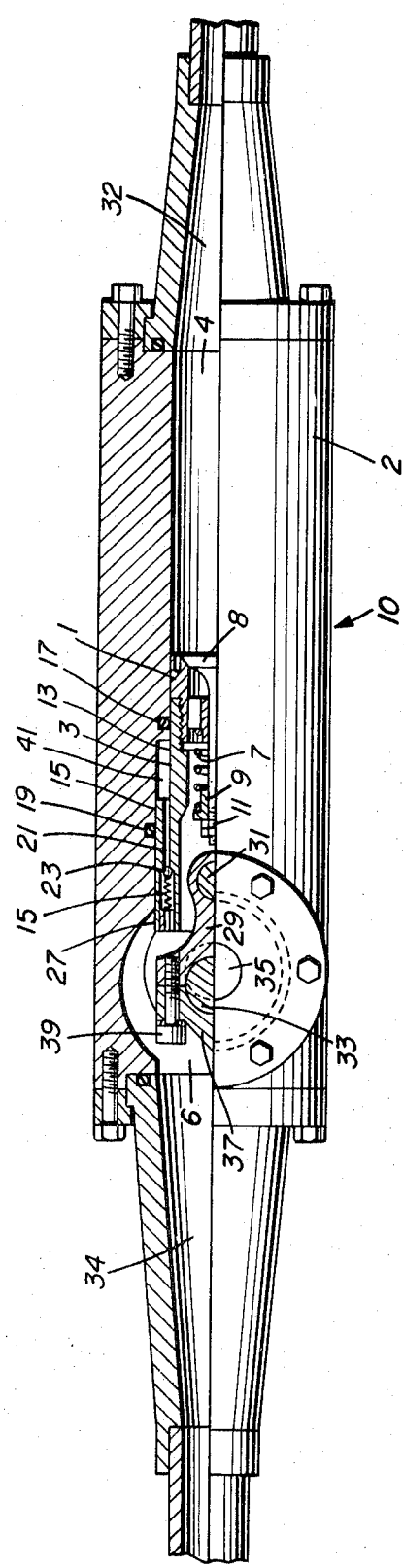
FIG. 2 is an enlarged view in partial vertical section of an energy wave generator which may be employed in the system.

One type of energy wave generator that may be used with this form of the invention, wherein energy bearing waves are used, is that as is shown in FIG. 2 wherein a cylindrical body 2 attached at opposite ends to conduits 34 and 32, receives slidably a piston 3 which is connected with the crankshaft 35 for reciprocation thereby, from some outside source of energy.

Piston 3 includes a wrist pin 31 to which is attached a connecting rod 29 which is attached to crank throw 33 by bearing cap 37 which is retained in place by bolts 39, so as to give reciprocation to the piston by the turning of crank shaft 35. The piston 3 is of a two or more step design with the larger area or areas 15 to the rear of the piston towards the connecting rod 29. Within this larger area 15 there is a small bore 21 which is unidirectionally yieldingly closed by spring 25 exerting a pressure against ball check 23, said spring 25 being held in position by spring retainer 27 which has a hollow center bore.

At the smaller diameter end 13 of piston 3 is valve assembly head 1 which is threadably attached to piston 3. Within the valve head assembly 1 there is slidingly retained valve 8 which is unidirectionally urged to a closing position by spring means 7 which is kept in a pressured condition by spring retainer 9 which is adjustably positioned by nut and thread means 11.

Surrounding the two step piston 3 there are packing means 17 and 19 which are enclosed within apertures within the two steps areas 4 and 6 of cylinder 2 so as to prevent leakage of fluid into the cylinder area 41 which separates the two areas of the piston. Should some leakage occur into this area 41 then upon forward thrusts of the piston 3 the reduced area that would occur would cause ball check 23 to open and reject the surplus fluid into the larger area 6.

By the proper pressuring of spring 7 and the regulating of pressure upon fluid in the entering area 6, then higher pressures may be maintained in and pumped through smaller area 4 by the reciprocation of piston 3, and the higher the rate of reciprocation of the piston 3 the greater the intensity of energy bearing waves that will be produced in both areas 4 and 6 of cylinder 2, except there will be a unidirectional more of a thrust forward of the piston 3 at the valve head 1 and a unidirectional addition to the particle velocity of the compression portion of the energy carrying wave being produced by the out-thrust of the piston against pressured area 4. Besides these features of the two step design of the piston 3, there is another very important function of this design. That is that when the pressures are adjusted within low pressure area 6 and high pressure area 4 in proper relationship between a fluid being conducted through valve 8 of piston 3, then the energy being exerted in the to and fro movements of the piston 3 is substantially in balance due to the larger area of entering area 6 as compared to the outflowing area 4. This has the same effect that would be occasioned by the stretching of a spring between two supports. Although there would be inward pressure applied to each of these supports, yet the center of the spring could be oscillated by a considerably smaller force than would be required should one end of the spring be released from its support and the same degree of oscillation be maintained in the remaining half of the spring, with the means of oscillation and remaining support being at the same location as when both halves of the spring were being supported in a stretched position.

These same features of pumping fluids from a lower pressure to a higher pressured area, the intensifying of an energy bearing wave by applying unidirectional thrust of particle velocity acceleration to the compression portion thereof, and the substantially equal balancing of opposing energies and of the required energy input, is shown, produced and taught in FIGS. 5, 31, 31–A, 32, 33 and 36 of my prior application Ser. No. 665,995, filed June 17, 1957 and continued on into my copending application Ser. No. 611,082, filed Jan. 23, 1967, except that in the design used in this copending application the balancing is done by using both the area of a lowered pressured area and an area of balance on an opposing pressured piston on a crank shaft, to achieve the balancing in opposition to the higher pressured area.

The above design in the copending application was very successful in actual practice, in that in operating the system at even high pressures, the balancing was so substantially free of vibration that persons other than the applicant would balance a nickel on edge on the base of the machine while it was operating, and the coin remained in an upright position without moving during continued operation of the machine.

However, besides the design in my copending application requiring considerable expense in the initial cost of manufacture as well as operational expense to maintain the system, it was found that in operating at high pressures bearing failure would result where the opposing pistons were attached on the crank shaft.

In the stepped piston, fluid throughout the energy wave output design used in this application, the above unnecessary manufacture and operational costs were eliminated and almost unlimited pressures and energy waves may be output through the system, within the limitations of sealing means for the pistons and the metals used in the system.

In operation, the energy wave generator of FIG. 2 may be preferably located at the pressure or compression and rarefaction portions of an energy carrying wave or waves where particle velocities are at a minimum or are nonexistent.

The use of this type of energy bearing wave generators as shown in FIG. 2 in this application is not limited to their use in a circular path or with fluids, but may be used singly or in series with themselves or in combination with other types of energy wave generators to produce accelerations of velocities of energy bearing waves to desired velocities of energy wave travel in the medium used, the limitations being at least that of needed applied input energies into the energy wave producing systems and paths of travel.

Also, the implosion and implosive reaction energy wave generator of FIG. 2 of my copending application Ser. No. 149,953, now U.S. Pat. No. 3,255,601, may be used in the system for fluid pumping means 10, either singly, in series with itself or with the energy wave generator of FIG. 2 of this application.

Figure 3:
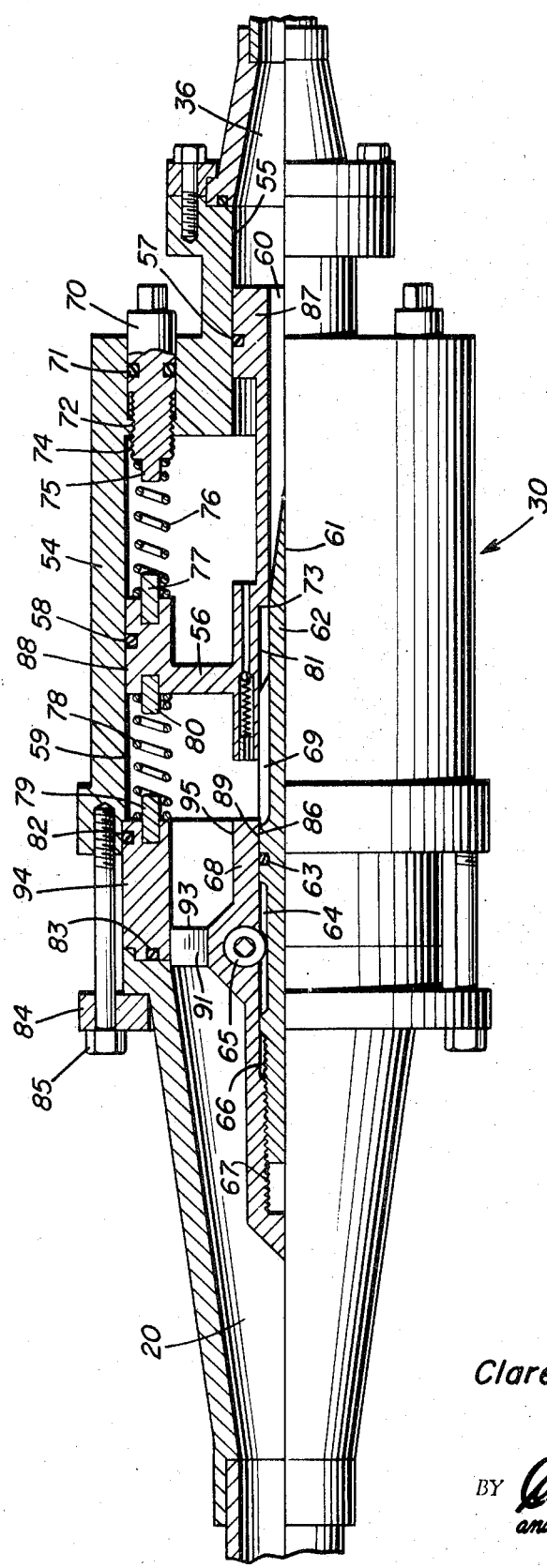
FIG. 3 is an enlarged view in partial cross section of another means which may be employed for fluid expansion in the system, and is more complex and utilizes an energy bearing wave to allow periodic fluid expansion.

Consider next FIG. 3 which is of a complex type of fluid expansion means 30 and one that is to be used within a system employing energy carrying waves. A main body 54 which is connected to fluid entering conduit 36 and fluid exiting conduit 20, has within it a two stepped piston 56. The smaller piston end 87 of the stepped piston 56 travels within smaller bore 55 ans has packing means 57 thereon, whereas the larger piston end 88 of the stepped piston 56 travels within bore 59 and has packing means 58 thereon. Between main body 54 and exiting conduit 20 there is interposed needle valve control body 68 which is in fluid seal engagement with body 54 by sealing member 82 and with conduit 20 by sealing member 83, and is locked to these members by pressure member 84 and bolt means 85 so as to be rigidly held in position.

Within needle valve control body 68 is needle valve 62 which is in close tolerance fit with bore 60 within the smaller piston 86 of stepped piston 56, so that in the position as shown at 73 the tapered end 61 extends into bore 60 and needle valve 62 closes bore 60 for a purpose later explained. Needle valve 62 has a larger portion 86 which extends back into needle valve control body 68 and which is grooved as at 69 for passage of fluid and which is in alignment with bore 81 within stepped piston 56. This larger portion 86 of needle valve 62 has a sealing means 63 against the escape of fluid along bore 89 and further along has angular gear teeth 64 cut thereon for causing rotation of the needle valve 62 when cross angled gear 65 is turned. This turning of the needle valve 62 causes screw threaded portion 66 to go into or out of threaded bore 67 according to whether the rotation is clockwise or counterclockwise. This entering or withdrawing of threaded portion 66 from threaded bore 68 in turn causes tapered end 61 to leave position 73 in further sealing bore 60 of piston 87 or by going the other direction in forming an increasing area of opening of bore and thus and allowing an increasing amount of fluid to escape into bore 69 then through bores 91 and thus out into exiting conduit 20, where it may expand. Also, if desired, control of the needle valve may be by use of pressures and/or temperatures from the system at selected points.

Bores 91 are several in number and extend radially around bore 89 within needle valve control body 68, and have ribs 93 separating the several bores 91, said ribs 93 being a rigidly strengthening and supporting means for outer part 94 and inner part 95, which are both integral parts of needle valve control body 68.

Stepped piston 56 is compressively held in a centered position by compressive springs 78 and 76 which are retained in position by retaining pins 79, 80 and 77, 75, respectively, and is adjustably compressively tightened or loosened by external adjustment means 70, which has a packing means 71 mounted thereon, for a purpose which will be later explained. The adjustment of control means 70 is accomplished by threaded portion 74 which engages threaded portion 72 within housing 54. Stepped piston 56 may also be operated by being connected to a connecting rod and crank shaft as is shown in FIG. 5 and driven by some external source of energy or energy be taken therefrom for external use, which could be an assisting means in the compression of vapors at point 50.

Stepped piston 56 is preferably constructed with the areas of small piston 87 and large piston 88 being that of a preselected balanced temperature and pressure condition of a fluid with its liquid state being against the head of piston 87 from conduit 36 and the vapor state being against the head of piston 88 as from conduit 20, as for instance in the use of Freon 12 where the temperature of the compressed liquid in conduit 36 is 86° F. and the temperature of the expanded vapor in the evaporative conduit 20 is 5° F., so that substantially equal opposing energies are balanced through the stepped piston 56 in its use in the system.

In the operation of the fluid expansion means 30 of FIG. 3, when the compressive portion of an energy wave in conduit 36 from an energy wave generator pushes against the end of piston 87 then large piston 88 likewise forms a compressive portion of an energy wave which goes outward in the vapor in conduit 20 as indicated by the direction of the arrows. But when the compressive springs 78 and the compressed vapor, as well as the rarefaction portion of the energy wave in conduits 36 and 20, return the stepped piston 56 against the compressive springs 76, then a dual increase of energy is given to the energy wave by this return action. The first of these is that there is a release of fluid pressure from conduit 36 through bore 60 within small piston 87 past needle valve 62. It is well known that to increase the intensity of an energy carrying wave, pressure or energy may be withdrawn during the rarefaction phase of the energy wave. So it may be seen that there is a resultant increase of energy given to the energy wave entering conduit 36. A still greater factor in the increasing of the energy bearing wave going outward from conduit 20 is that when the compressed liquid is released on the return stroke of piston 88 by needle valve 62 within the evaporative area of conduit 20, then a substantially instantaneous cooling effect is given during the rarefaction phase of the energy wave going outward from large piston 88 into the evaporative area represented by conduit 20. It is well known that to add cold to or subtract heat from or during the rarefaction phase of an energy wave increases the intensity of the whole of the wave, so here energy is given to or increased in the energy wave. Thus it may be seen that fluid expansion means 30 does in fact have a dual effect in increasing the intensity of the energy carrying wave.

Also, if desired, for fluid expansion means 30, an implosion or implosive reaction energy wave generating fluid expansion means as shown in FIG. 3 of my copending application Ser. No. 149,953, now U.S. Pat. No. 3,255,601, may be used. Except as used in this application, the positioning of the means is reversed as used in the copending application, with the implosive reaction generator being faced towards the vapor portion of the system, and not towards the liquid phase of the system.

The fluid expansion means of FIG. 3 or the means of FIG. 3 of my copending application Ser. No. 149,953, now U.S. Pat. No. 3,255,601, when used in combination with any of the energy wave generators discussed in this application, may be used to transfer heat or cold to or from a distance, as to or from some target, which could be heat within the earth or heat removal from various processes after their work has been accomplished by the heat, or cold to cold receiving stations as of different floors of a building or separate buildings to which cold is desired to be delivered and received, from an area of absence of heat whereby the heat is abstracted from or cold given into the rarefaction portion of the energy waves that transfer the cold. They may also be used to vaporize or assist in the vaporization of liquids to form steam or vapor for use in the various vapor distillation processes such as used in refineries and saline water conversion processes and the energy given off during and by the fluid expansions and added to the energy waves being created by the energy wave generators could be utilized for useful work, as in other portions of the systems and processes.

Figure 4:
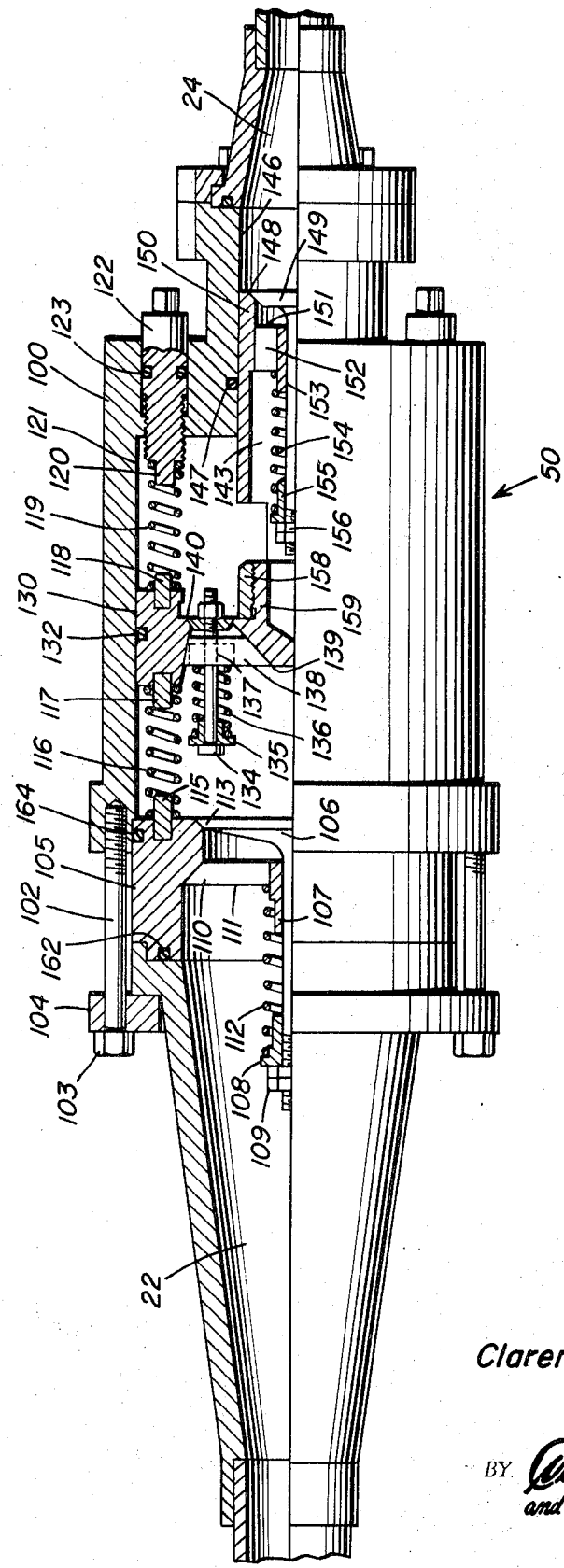
FIG. 4 is an enlarged view in partial cross section of another means of fluid pressure increase or vapor compression that may be used in the system, and is more complex and requires that an energy bearing wave generator be in the system for its use.

Next considering FIG. 4 which is of another fluid compression means 50 wherein there is an outer cylindrical body 100 which is rigidly and securely attached to valve body 105 and then to entering vapor conduit 22 at the left side, and to exiting substantially all liquid fluid conduit 24 to the right. Within cylindrical body 100 there is two stepped pistons 130 and 150 which is preferably composed of two parts, the larger of the parts of piston 130 being in sliding contact with the large internal bore 121 within cylinder 100 and has sealing member 132 thereon and is attached as by threaded portion 159 to threaded portion 158 of a smaller part of piston 150 which has sliding engagement within bore 146 in body 100 and is in sealing engagement with bore 146 by means of sealing member 147.

Within larger piston part 130 there is located ring valve 141 which seats on valve seats 140 that allow unidirectional opening of the ring valve towards ports 143 which are located rearwardly on smaller piston part 150. Spring holding members 134 are several in number and are axially spaced on a radius from the center of piston 130 and screw threadedly engaged into ring valve 141 and locked by nut means 142 after proper compression of valve springs 136 has been accomplished. Valve springs 136 are retained in proper position by retainers 135 and recess bores 137 which are in axial position on ribs 139 which rigidly connect larger piston 130 with screw thread attachment means 159. There are open bores 138 in alternation with ribs 139, which allow unidirectional flow of fluids to the right in the direction of the arrows when ring valve 141 is open. Within smaller piston 150 there is located valve 149 which is unidirectionally urged to a seating with valve seat 148 by means of compression spring 154 which is held in position by valve guide 153 and retainer 155 and held in desired compression by locking nut means 156, said valve 149 allowing flow of fluid from ports 143 unidirectionally to the right from the head of the smaller piston 150. Valve guide 153 is rigidly held in position by ribs 151 which are preferably three in number in order to allow a maximum amount of area in bores 152 for flow of fluid therethrough.

Stepped piston 130 and 150 is compressively held in a centering position by compressive springs 116 and 119 which are retained in position by retaining pins 115, 117 and 118 and 121, respectively. Retaining pins 115 are recessed within valve body 105, retaining pins 117 and 118 are recessed within opposite sides of large piston 130 and retaining pins 121 are part of spring adjustment member 122. Spring adjustment member 122 has, on its shaft, sealing member 123, and has screw threads on a portion thereof that engage screw threads within body 100, so that increase or lessening of a compressive force may be exerted upon compressive springs 117 and 119, by turning of adjustment member 122.

Valve body 105 is rigidly held in position between cylindrical body 100 and fluid entering conduit 22 by bolt means 103 which engage pressure ring 104, and is kept in sealing engagement with said members by sealing members 162 and 164. Valve 106 is urged to a seating engagement with valve seat 113 by compressive spring means 112, which is held in position by valve guide 107 and retainer 108 which is locked in proper compressive condition by nut means 109. Valve guide 107 is held in proper alignment by means of ribs 111 which are preferably three in number so as to allow a large amount of fluid to flow unidirectionally through ports 110 towards large piston 130 when valve 106 is opened. Stepped piston 130 and 150 may also be operated by being connected to a connecting rod and crankshaft as is shown in FIG. 5 and driven by some external source of energy, which could be from the energy derived by the expansion of the fluid as by fluid expansion means 30.

Stepped piston 130 and 150 is preferably constructed with the areas of small piston part 150 and large piston part 130 being of that of a preselected balanced temperature and pressure condition of a fluid with its substantially all liquid phase being against the head of piston 150 from conduit 24 and the vapor state being against the head of large piston 130 as from conduit 22, as, for instance, in the use of Freon 12 where the temperature of the compressed liquid in conduit 24 is 95° F. and the temperature of the expanded vapor in evaporative conduit 22 is 0° F., so that substantially equal opposing energies are balanced throughout the stepped piston 130 and 150 in its use in the system.

In the use of this means of fluid compression 50 of FIG. 4 in a system also using the fluid expansion means 30 of FIG. 3 where conduits 22 and 24 are connected to opposite sides of an evaporative area 16, the piston areas of large piston 130 of FIG. 4 and piston areas of large piston 88 of FIG. 3 should be in approximate balance so that a balanced condition of pressure would exist across the evaporative area.

In the operation of the fluid compressive means 50 of FIG. 4, when the compressive portion of an energy wave in conduit 24 reverses back from an energy wave generator against the end of piston 150, large piston 130 has a compressive action against the area encompassed between valve head 106 and said piston 130. That compressive action against any fluid therein forces the fluid outward past ring valve 141 into the expanding area in cylinder 100 and closes valve 106 against any entry of fluid from conduit 22. However, when the rarefaction portion of the energy wave in conduit 24 contacts the head of small piston 150, the compressed springs 116 and where the evaporative area or tubes 18 contained in evaporator 16 are properly tuned as to length so that an integer multiple of a half wave length of the fundamental wave length or one of its harmonics matches an integer multiple of a half wave length of the prime wave length or one of its harmonics being generated in the condenser by the energy wave generator, the compressive portion of the wave in the evaporator opens valve 106 and acts as an assisting compressive force against large piston 130 to compress the fluid between valve 141 riding with piston 130 and through the ports in the rear of small piston 150 and out through the valve 149 in the head of piston 150.

Where the pressure area of the large piston 130 equals the density of the refrigerant in its vapor state from conduit 22 as compared to the pressure area of the smaller piston 150 against the refrigerant in its liquid state in conduit 24, the movement of the piston forward imparts a liquefying pressure on the fluid going outward past valve 149 and but for the heat contained in the fluid it would be in a completely liquid state. Upon the next reversal of the compressive impulse this heat is substantially absorbed into this compressive portion of the integer multiple of the half wave being generated in the condenser and the energy wave is greatly encouraged or intensified for its next reversal of compression which in turn causes greater compressive action within cylinder 100 and greater cooling in the evaporator section 16 as well as more heating effect, by that heat not absorbed by the compressive portion of the energy wave, in the condensing portions 12 and 14. Where more heat was desired to be obtained from the condensing portion of the system, as might be desired in heat pumping for home and industrial use, then heating tubes could be conducted off of the area between valve 106 and piston 130 and/or the area between valve 141 riding in piston 130 and the intake ports 143 in small piston 150, and the heat taken from these tubes or condensing area.

If desired, compressive means 50 of FIG. 4 may be placed in close proximity to the energy wave generator, with no appreciative length of wave length therebetween, and balance still be maintained in the system. This I have done with considerable success in use as taught in my prior application Ser. No. 665,995, filed June 17, 1957 and continued on into my copending application Ser. No. 611,082, filed Jan. 23, 1967, as to FIGS. 5, 31, 31-A, 32, 33 and 36, except that in this copending application I am using but one stage of compression for pressuring the fluid to the low pressure side of the energy wave generator. This required the use of a pump in connection with the wave generator in its various oil field uses such as formation fracturing and repressuring of substantially depleted oil sands. With the use of this compression means of FIG. 4 and its several stages of compression, a pump will no longer be required to be used with the energy wave generator to increase pressures of fluids from sub-atmospheric to high pressures required for some oil and gas field uses, and the sole energy requirement will be that put into the operation of the energy wave generator, yet by proper use a substantially balanced system may still be operated. The fluid pressuring means may be placed in close proximity to the energy wave generator or for convenience the wave generator may be placed adjacent the well head and the fluid compression means of FIG. 4 may be placed at any location that is tuned to an integer multiple of a half wave length of the prime wave length or one of its harmonics that is being used between the energy wave generator and the bottom of the well bore.

Further, where accelerations of velocities are being given to energy waves as by repetitive increasing of velocities, as is discussed earlier in this application, then the compressive means as in FIG. 4 may be used to assist therein in supplying fluid to the acceleration system or being contained within a circulatory energy wave accelerating system and the system be maintained in substantial balance in increasingly higher accelerations and pressure increases of energy carrying waves. Areas of work may be taken off of the acceleration system such as for treating and/or fracturing of oil and gas bearing formations, or in secondary recovery use, as where a circulatory system was employed, with the accelerated energy waves being taken down either the casing or the tubing and returned up the other, and the accelerated waves could be either returned past a check valve down the well bore again or circulated through the compressive means of FIG. 4 and the energy wave generator, whether the wave generator be of that type shown in FIG. 2 or the implosive type shown in FIG. 2 of my copending application Ser. No. 149,953, now U.S. Pat. No. 3,255,601.

Also, any of the above energy wave systems using the fluid compressing means of FIG. 4 may be employed to transfer heat to a distance, as to some target, which could be an oil bearing formation, or a heat receiving station as to different floors of a building or separate buildings to which heat is desired to be delivered and received, from a source of heat whereby the heat is given into the compression portion of the energy waves that transfer the heat. They may also be used to liquefy gases and as condensing means for used steam and the various vapor distillation processes such as used in refineries and saline water conversion processes and the heat of vaporization could be given over into energy wave energy which could be utilized ahead of the energy wave generators for useful work, as in other portions of the systems and processes.

The foregoing is considered as illustrative only of the principles of this invention. Further, since numerous modifications and changes will readily occur to those skilled in the art, it is not desired to limit the invention to the exact constructions and operations shown and described, and accordingly all suitable modifications and equivalents may be resorted to, falling within the scope of the appended claims.

What is claimed as new is as follows:

1. The method of unidirectionally pumping fluids by an energy wave generator from a lower pressure to a higher pressure with lowered requirement of input of outside energy comprising reciprocating by an outside energy source a stepped area piston having a valve therein between the lower pressure and unidirectionally toward the higher pressure, with the pressure-area relationship of the larger piston in contact with the lower pressured fluid being throughout its reciprocation substantially equal and in balance to the pressure-area relationship of the smaller area of the piston in contact with the higher pressured fluid, producing in said higher pressured fluid an integer multiple of a half wave of an energy wave having compressions and rarefactions alternately at the face of said piston in contact with said higher pressured fluid and introducing said fluid from said lower pressure into said higher pressure during rarefactions existing in said energy wave being produced in said higher pressured fluid.

2. The method of claim 1 wherein the lower pressured fluid is maintained in compression by a compressing means.

3. The method of claim 2 wherein said compressing means is several stages of compression.

4. The method of claim 3 wherein each of the stages of compression has its own compressing means.

5. The method of claim 1 wherein said energy wave generator produces energy carrying waves in both the lower and the higher pressure of fluids.

6. The method of claim 5 wherein said energy carrying waves are the means of operating several stages of compression of fluids entering the lower pressured fluid.

7. The method of claim 6 wherein the several stages of compression are placed at a distance from the energy wave generator of an integer multiple of a half wave of the energy waves being generated by said energy wave generator.

8. The method of claim 6 wherein said fluid is heated and said several stages of compression add the heat into the compression portions of said energy waves, delivering said heat in the energy waves to a receiving station, and thereupon depositing said heat from the compression portions of said energy waves.

* * * * *